United States Patent [19]
Thibos

[11] Patent Number: 4,838,970
[45] Date of Patent: Jun. 13, 1989

[54] METHOD OF MAKING AN ASSEMBLY COMPRISING A FORAMINOUS CORE, SELF-LOCKING, HELICALLY WOUND, HOLLOW FIBER BUNDLE

[75] Inventor: Patricia A. Thibos, Concord, Calif.

[73] Assignee: The Dow Chemical Company, Midland, Mich.

[21] Appl. No.: 121,974

[22] Filed: Nov. 18, 1987

Related U.S. Application Data

[62] Division of Ser. No. 747,629, Jun. 24, 1985.

[51] Int. Cl.$^4$ .................... B31C 1/00; B65H 81/00; B65H 81/06
[52] U.S. Cl. .................................. 156/169; 156/175; 210/321.87; 210/321.74; 210/497.1
[58] Field of Search .............. 156/173, 175, 169; 210/497.01, 433.1, 321.74, 497.1

[56] References Cited

U.S. PATENT DOCUMENTS

| | | | |
|---|---|---|---|
| 3,422,008 | 1/1969 | McLain | 210/22 |
| 3,690,465 | 9/1972 | McGinnis et al. | 210/321 |
| 4,080,296 | 3/1978 | Clark | 210/323 |

Primary Examiner—Michael W. Ball
Assistant Examiner—Gregory J. Wilber
Attorney, Agent, or Firm—Robert R. Stringham

[57] ABSTRACT

Elongated, large diameter, helically wound, hollow fiber bundles which are stable, do not require "dead-end tubesheets" to keep the bundle ends from slipping and exhibit only slight "dog-boning" can be formed by controlling the winding parameters so that the bundle consists of successively shorter or longer "formations" of successively longer strata, each stratum consisting of from about one to a plurality of coverages (of the underlying core or bundle surface).

6 Claims, 5 Drawing Sheets

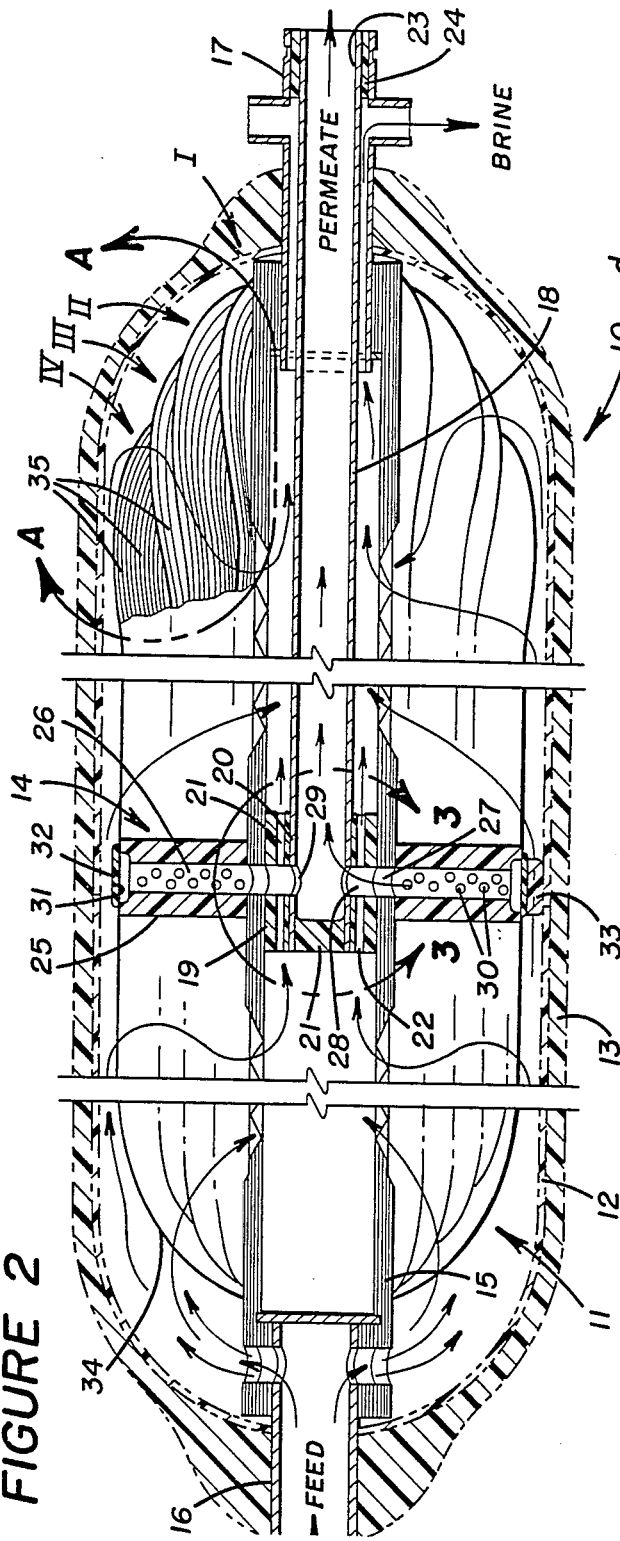
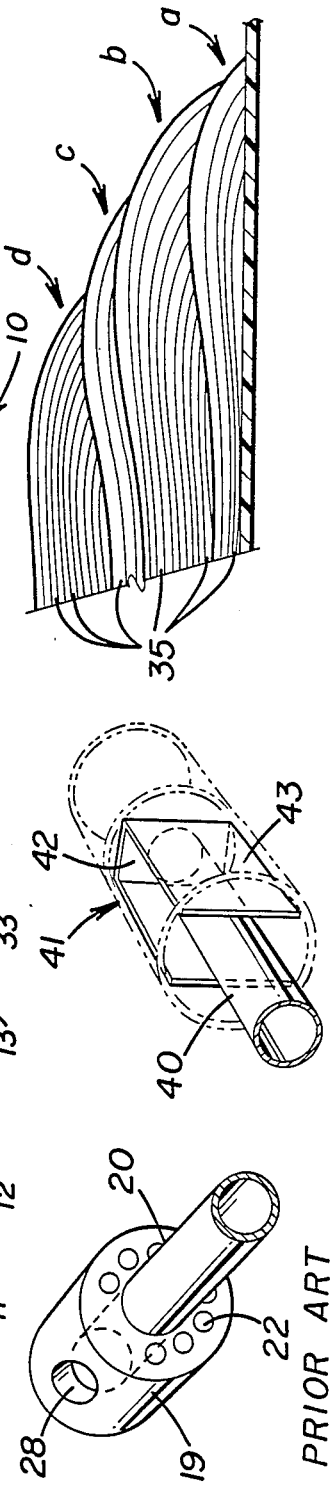
FIGURE 2
FIGURE 2-A
PRIOR ART
FIGURE 3
FIGURE 4

$\cos A = W/X$ $\sin A = W/W_a$ $\sin A = \dfrac{\pi D}{2} \div \dfrac{\ell}{2} = \pi D/\ell$

KNOWN RELATIONSHIPS FOR HELICAL WINDS

KNOWN RELATIONSHIPS FOR HELICAL WINDING

Z = 5
C = 1 (FOUR REPETITIONS)
P = 1 (LAGGING)

Z = 5
C = 2 (TWO REP'S)
P = 2 (LEADING)

Z = 6
C = 1 (FIVE REP'S)
P = 2

Z = 7
C = 2 (THREE REP'S)
P = 2

Z = 7
C = 3 (TWO REP'S)
P = 2

METHOD OF MAKING AN ASSEMBLY COMPRISING A FORAMINOUS CORE, SELF-LOCKING, HELICALLY WOUND, HOLLOW FIBER BUNDLE

BACKGROUND OF THE INVENTION

The invention claimed in this application was made in the course of a United States Government Contract, No. 14-34-0001-0501 (OWRT).

CROSS REFERENCE TO RELATED APPLICATION

This is a divisional of application Ser. No. 747,629 filed June 24, 1985.

U.S. Pat. No. 4,080,296 discloses a hollow fiber permeator unit individually capable of producing 250,000 gallons per day of processed water. The unit comprises an elongate, ordered bundle of selectively permeable hollow fiber lengths passing through a central, pressure balanced tubesheet and formed around a perforated feed tube containing a coaxially disposed, permeate discharge conduit, which is connected through radially disposed cross-conduits to permeate collecting bores in the tubesheet. The resulting assembly is enclosed in a filament-wound casing interrupted only by the tubes extending from its ends. The ends of the hollow fiber bundle are potted in resinous wall members which do not function as tubesheets but serve to lock the fiber bundle to the core and to maintain the radial spacing between the portions of the fiber lengths at each end of the bundle. Means, such as fabric wraps, may be employed to constrain the bundle and/or to improve uniformity of the distribution of feed flow between the fiber lengths.

The foregoing type of unit, the so-called "quantum module" constitutes a considerable advance in permeator technology but would be even better if the terminal, resinous wall members—"dead end 'tubesheets'"—could be dispensed with. That is, the portions of the fiber bundle potted in the terminal wall members are unproductive but could be utilized for permeation if they were not so potted. However, it has not been apparent how the requisite locking and spacing could be achieved in the absence of those wall members or art-recognized equivalent constraining means.

A problem encountered in helical winding of large diameter bundles of hollow fiber lengths—a method of bundle construction which otherwise would be highly attractive—is build up of terminal bulges or "humps" near the ends of the bundle. That is, as a result of the necessary turn-around as the direction of wind is reversed at the end of the developing bundle, the assembly takes on a dumbbell-like configuration commonly called a "dog bone" shape. This shape prevents efficient utilization of the space between the casing wall and the smaller diameter section of the bundle and also increases flow distribution problems.

The problem of dog-boning is exacerbated when the sections of the core which underlie the fiber turn-arounds at each end of the windings are not of constant diameter, even though the change in diameter is not abrupt, i.e., is uniformly distributed over several inches of core length.

One prior art method of "avoiding" the dogbone problem is to make the bundle longer and form wall members inboard of the end bulges and then to cut off enough of each wall member to convert it to a tubesheet, the bulged bundle portions being cut off at the same time; this of course is quite wasteful Another method is not to pass the fibers (strand, tow, roving or band) around the core at turn-around (true helical winding) but to approximate helical winding at a shallow wind angle by circumferentially winding on a separate filament at each end of the construct in such manner that the fiber lengths are looped around these filaments during turn-around; some, but substantially less, dog-boning results. To be ale to utilize helical winding without resort to end ties, fiber wastage or settling for dog-bone shaped fiber bundles is highly desirable.

Another problem in winding large bundles, which is particularly acute when the fibers are wet, is slippage and slumping of the bundle, i.e., bundle instability. It is possible to anchor small diameter bundles of fibers by including in the core end sections of abruptly reduced diameter and winding over and beyond the annular "shoulder" or "step" thereby provided. However, this does not suffice to make a large diameter bundle stable.

The prior art, to the best of the present inventor's knowledge, does not suggest that large diameter, helically wound filament bundles can be made stable and self-locking simply by manipulating the parameters involved in laying the helical winds on an axially rotating core However, even if it did, there would remain the question of whether or not those parameters could still be held within the constraints imposed when the filaments are relatively fragile hollow fibers and the bundle formed must function effectively in a permeability separation device.

OBJECTS OF THE INVENTION

The primary object of the invention is to provide an assembly which can be utilized in a permeator and comprises a foraminous core, a pressure balanced tubesheet and a stable, large diameter, helically wound hollow fiber bundle which is self-locked on the core and has the general shape of a cylindrical pressure vessel with rounded ends.

A corollary object is to dispense with separate means for restraining the bundle end-portions and maintaining uniform inter-fiber spacing therein.

A further object is to avoid wastage of fiber and potting materials.

Another object is to maximize utilization of the fiber bundle per se.

An additional object is to provide an assembly of the foregoing type in which flow through the bundle (between the fibers) is inherently more uniform.

Also, an object is to fully utilize the advantage of "outside in" feed flow.

Still other objects will be made apparent to those knowledgeable in the art by the following specifications and claims.

BRIEF DESCRIPTION OF THE DRAWINGS

FIG. 2 depicts, in broken, shortened, vertical cross-section, taken in a plane which includes the core axis, a permeator which is of the general type disclosed in U.S. Pat. No. 4,080,296. However, the core/tubesheet/fiber bundle inner assembly differs in two main respects: (1) there are -no wall members (--dead end "tubesheets") at the ends of the fiber bundle, and (2) the fiber bundle is a helically wound bundle which is organized into four "formations", each consisting of a plurality of "strata", and has been formed by the method of the present invention. The latter assembly has been derived from one of the present invention essentially the same as that of FIG. 1 but including in the core a feed inlet fitting, a central cross-flow block, a permeate discharge pipe and a coaxial brine discharge fitting. Only those fiber strata portions which make up the upper right-hand portion of the fiber bundle are depicted in FIG. 2. An enlarged view of the latter bundle portion is shown in FIG. 2A.

(No cross-section in a plane at right angles to that of FIG. 2 is believed necessary for an understanding of the present invention. However, reference may be had to FIG. 2 of the above-referred-to '296 patent—the disclosure of which is incorporated herein by reference, for all purposes which may be legally served thereby.)

FIG. 3 is a perspective view of the cross-flow block and a portion of the permeate discharge pipe in FIG. 2; although the particular cross-flow block shown is novel, it is considered generally equivalent to the one illustrated in the '296 patent, and is accordingly labeled as prior art. As shown, the block, pipe and fittings have been incorporated in the core prior to forming the fiber bundle and wall member (tubesheet precursor).

Figure 1:
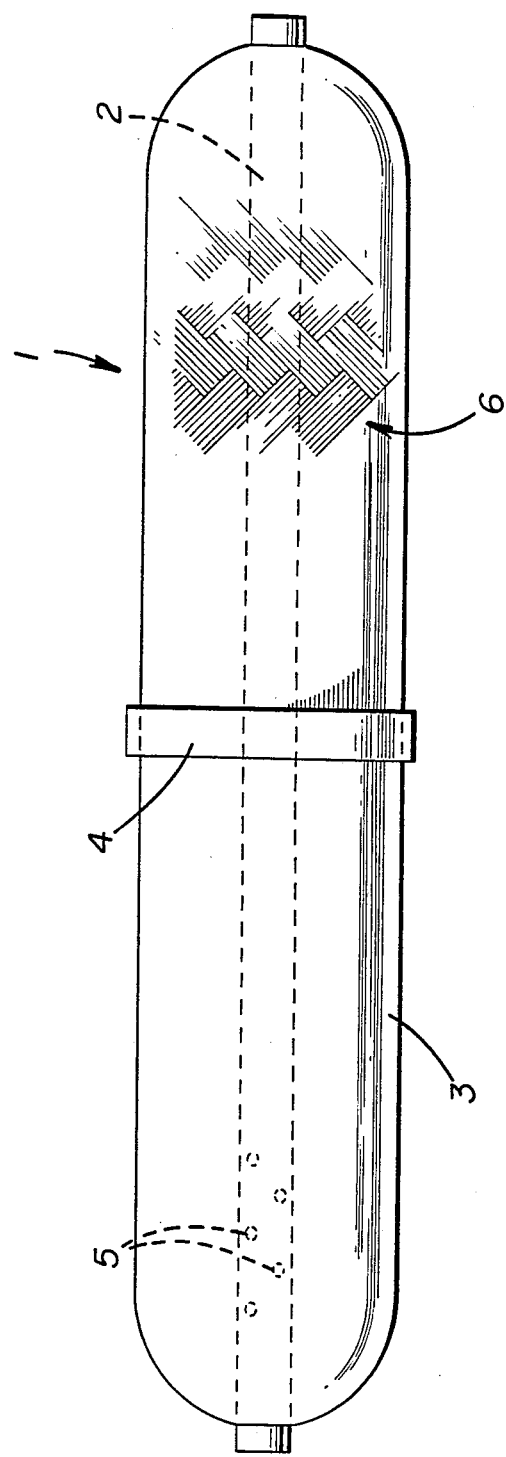
FIG. 1 is an idealized, perspective view of an assembly of the present invention comprising only a hollow core, a helically wound bundle of permeable hollow fiber lengths and a centrally disposed, toroidal, resinous wall member which can be converted, by drilling, cutting, etc., to a tubesheet. A portion of the interlaced fibers defining the surface layer of the bundle is shown magnified.

FIG. 4 is a perspective view of an incomplete form of a cross-flow block which (together with the permeate pipe) can be post-inserted in the core component of a pre-formed assembly of the invention such as the one depicted in FIG. 1. (The block may be completed and bonded to the core by emplacing and curing a resin in the spaces between the core and the portion of the permeate pipe within the block (in the manner described hereinafter).

Figure 5:
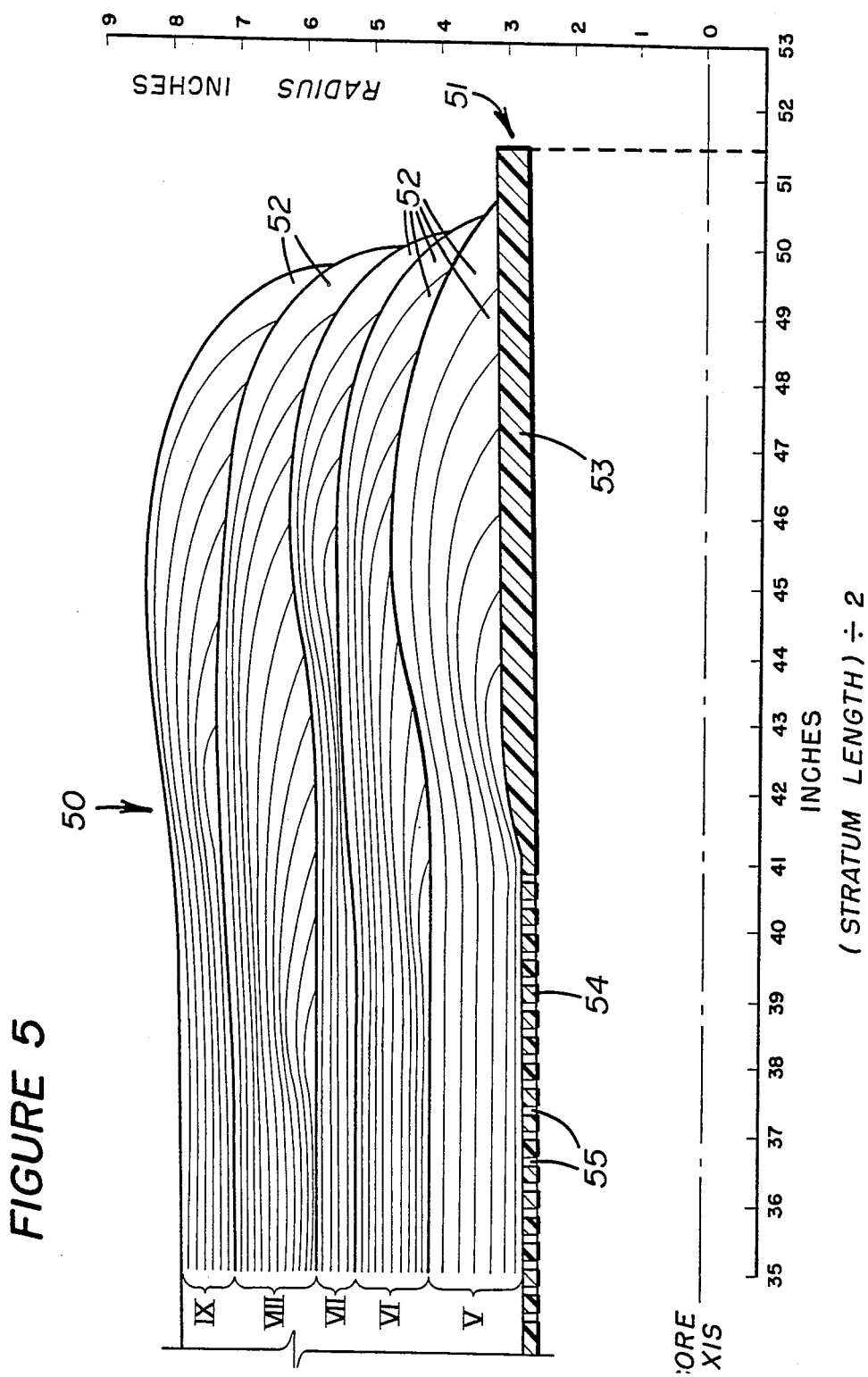

FIG. 5 depicts, in the manner of FIG. 2A, a portion of a larger fiber bundle formed by the method of the present invention, the fiber strata being more numerous and differently disposed than those in FIG. 2A.

Figure 6:
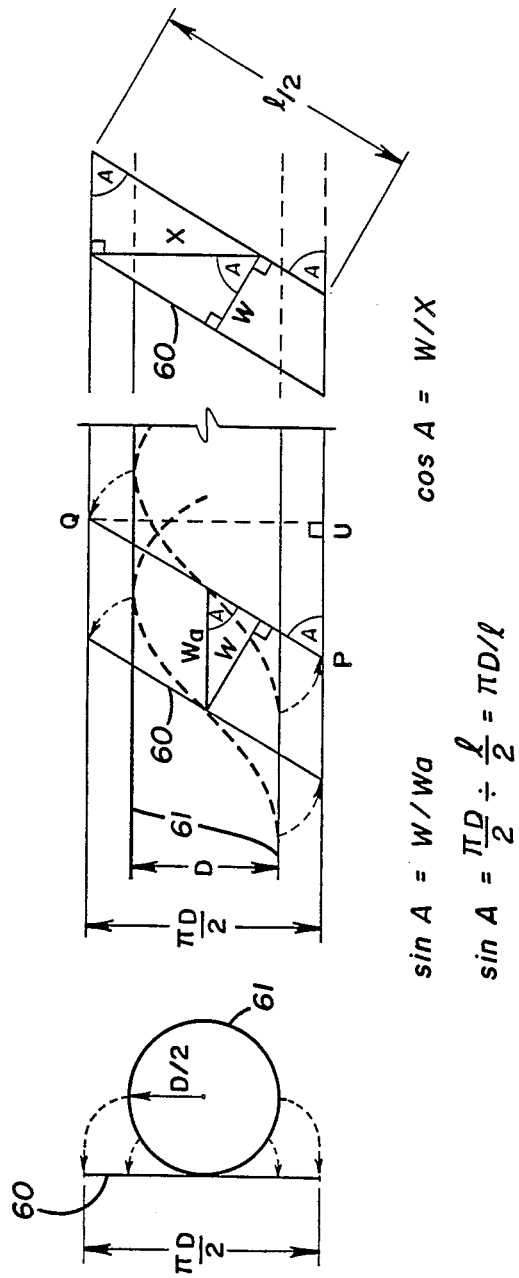

FIG. 6 is a representational diagram provided only to facilitate understanding of how the cylindrical winding angle A relates to the normal, axial and circumferential band widths, or to the "pipe" diameter and the unwound, rectilinear length of one turn of the winding.

Figure 7:
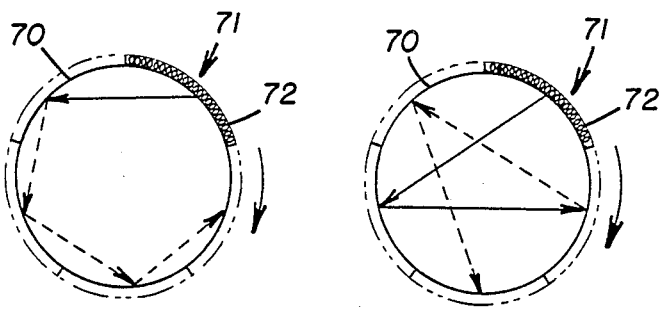
Figure 7:
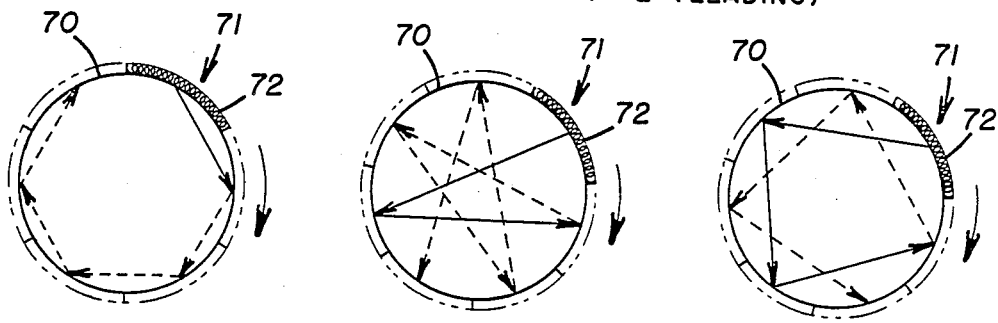

FIG. 7 is a semi-schematic representation explanatory of the definitions of C, the number of circuits per pattern, and P, the progression of the pattern. Also, the relationship between C and Z, the number of circuits per coverage, is shown.

It should be noted that in FIGS. 2, 2A and 5, the last stratum in each formation, though depicted by a somewhat heavier line, does not actually differ from other strata in a corresponding manner.

Also, the fiber bundles in FIGS. 2, 2A and 5 consist of large numbers of hairlike hollow fibers which would be severed at a wide range of angles in an actual cross-section. However, to attempt to depict the severed fiber ends in the cross-sectional views of the drawings would make it very difficult to distinguish the relative positions and shapes of the strata—which is what is essential to an understanding of the present invention.

SUMMARY OF THE INVENTION

It has been discovered that the foregoing objects can be achieved by controlling the helical winding of the fibers in such manner that the resulting bundle consists of successively shorter or longer "formations" of successively longer "strata", each stratum consisting of from about one to a plurality of "coverages". This results in shifting the location of the dog-boned portion or "hump" in each formation back and forth so that successive humps are not directly overlying but acrete to give the bundle ends a substantially smooth, rounded shape. It also results in underlying strata being locked in place by overlying strata.

Ordinarily, the resinous body which will become the tubesheet is incorporated in the assembly as a radially disposed wall member built up by applying a band of viscous potting resin—which is hardened or allowed to harden in place—at the equator of the assembly, as it develops. At completion of the winding and potting operation, the resulting assembly has utility in the sense that the wall member can be converted to a "live" tubesheet and the assembly then incorporated in a complete permeator unit.

Optionally, more than one live tubesheet (to be) may be incorporated in the assembly. Also, the advantages of the present invention may still be realized to a large extent—particularly when the length of the bundle is relatively great—even if wall members (dead-end "tubesheets") are included in the assembly as defined below.

The assembly of the invention may be more narrowly specified as one which comprises a core, a fiber bundle and one or more wall members and can be adapted for use as a component of a permeator, said core being a rigid, generally cylindrical, elongated conduit having two end sections and an intervening foraminous section, said bundle comprising hollow fiber lengths disposed around said core in the form of two generally dome-shaped end portions, from which said end sections cylindrical portion,
and each of said wall members being a generally toroidal, resin body through which said core and said fiber lengths pass in sealing engagement therewith;

said fiber lengths being wound, preferably in bands, around said core as a series of criss-crossed helices of successively greater diameter and in such manner that said bundle is stable and self-anchored to the core, at least one of said one or more wall members being adaptable to function as a tubesheet in said permeator
and each end of each of said fiber lengths or bands being disposed within one of said wall members which is so adaptable.

Preferably, the fibers have permeable walls and the core component of the assembly has disposed within it plumbing means, such as, for example, a cross-flow means for each wall member to be converted to a tubesheet and one or two end-fittings adapted to function as fluid inlet or discharge means, etc. (See FIG. 2.)

In a process aspect, the invention may be defined as the method of forming an assembly as defined above which comprises:

A. providing said core and selecting one or more hoops of the core surface as sites for construction of said wall members, B. forming said bundle and wall members on said core
   (1) helically winding one or a succession of bands of hollow fiber lengths around said core in an alternating series of right- and left-handed helices, each band starting at about the midline of one of said sites and terminating in a plane at about the midline of the same or a different one of said sites
while
   (2) applying a hardenable resin to said core and said band at each of said sites and thereafter continuing to apply such a resin to the resulting resin/fiber bodies forming at those sites,
and
C. allowing or causing said resin/fiber bodies to harden; said winding being done in a succession of stages, as follows, to form said bundle as a radial sequence of successively shorter or longer formations, each of successively longer strata, each stratum consisting of from about 1 to a plurality of coverages;
   in stage I
   (a) several ($N_a$) coverages of about equal axial length and of successively greater diameters are wrapped on to produce a first stratum which does not extend to either end of the core and is at least slightly humped proximal to each end of the stratum, as a consequence of the more localized accumulations of fiber during the turnaround portion of each end to end wind,
   the turnaround range and dwell, the value of $N_a$ and the tension on the fiber lengths being selected, according to the fiber and band dimensions, so that said first stratum will not slip on the core and the taper of the non-cylindrical end portions of the stratum will be sufficiently abrupt to provide substantial resistance to axial motion of an overlying, longer, second stratum if such is formed and emplaced as in (b);
   (b) said second stratum is formed in essentially the manner in which the first stratum was formed and has a length such that the second stratum extends beyond each end of the first stratum;
   (c) a succession of additional strata are added, as in (b), until the two ends of the resulting first formation are at least noticeably humped,
   in stage II
   step a is repeated, except that the resulting first stratum is shorter or longer than the preceding first stratum,
and
   steps b and c are repeated until the resulting second formation is at least noticeably humped at each end,
   with the result that the hump peaks of the second formation are closer together or further apart than those of the underlying first formation;
   in each stage thereafter, steps a-c are repeated, the lengths and N values of the successive strata being such that each formation has a substantially different inter hump-peak distance than the immediately preceding formation and each end of the finished bundle has the general configuration of a dome with a polar opening conforming to the core end protruding therefrom.

Definitions of Terms

Terms not specific to winding operations.

"Generally cylindrical"

is intended to include cores or bundles which are of polygonal cross-section. Unless the contrary is indicated, the word "cylindrical" is used henceforth as synonymous with "generally cylindrical".

"Hoop of core surface"

the surface of a short cylindrical section of the core.

Permeator

Any device utilizing as a permeable membrane the walls of a large number of hollow fibers - a permeable membrane being one through which at least one component of a fluid (gaseous or liquid) stream will pass under a pressure differential less than that at which the membrane ruptures. Preferably, the membrane is selectively permeable.

Fiber band

A belt- or tape-shaped plurality of generally parallel lengths of individual fibers or distinct fiber tows. The fibers constituting a tow are not necessarily uncrossed and the thickness of the tow will usually be greater than the diameter of a single fiber length.

Stable bundle

A bundle of fiber lengths (disposed around a core) which is resistant to alteration of spacing or positioning of fiber portions throughout the bundle and is resistant to deformation.

Self-anchoring

Able, without the aid of any adhesives, potting resin bodies or mechanical constraints to strongly resist forces which would otherwise cause slippage of the bundle along the core. It is to be understood that inclusion of dead-end tubesheets, core shoulders, adhesives, etc., in the assembly does not thereby remove the assembly from the ambit of the present invention, so long as the bundle would still have been self-anchoring if those auxiliary anchoring means had not been included in the assembly.

End of bundle

With regard to the placement of a radial wall member, either a generally dome-shaped end-portion of the bundle or, when the latter portion will be cut off in subsequent adaptation, the part of the cylindrical portion immediately adjacent to the domed portion.

Inter hump-peak distance

The distance, parallel to the core axis, from the peak of the hump at one end of a formation (or stratum) to the corresponding peak at the other end.

DETAILED DESCRIPTION

In order to construct the assemblies of the present invention in a practical manner, it is highly preferred to employ a winding machine which will rotate the core about its long axis (on an arbor or mandrel) while feeding onto the core a tape, tow, yarn, skein or band of at least generally parallel fiber lengths through a guide of some sort which traverses back and forth on a line parallel to the core axis. However, it is also possible to achieve the necessary motion of the guide relative to the core by holding the guide in a fixed position and moving the core back and forth along its own axis while it is rotating, to rotate the guide around a linearly reciprocating, non-rotating core or to reciprocate and rotate the guide around a motionless core.

The mode of winding above-identified as preferred is well established in the art (of winding composite pressure vessels, for example) and utilizes commercially available winding machines which can also be used to fabricate the casing in which the completed permeator assembly will be placed. In this mode, the guide starts each "stroke" (end-to-end traverse) at zero velocity ("dwell"), accelerates to a preselected finite velocity, maintains that velocity until it approaches the end of the stroke, decelerates to zero velocity and dwells briefly at its position of maximum travel. The cylindrical portion of the bundle is formed during the constant velocity portions of the successive strokes and the generally dome-shaped end portions are formed during the "turnarounds" (deceleration dwell and acceleration in reverse direction).

Winding Terminology

In helical winding, the section of fiber band applied to the core (or developing bundle) in one revolution is called a "turn". The coil of turns formed in one stroke is a right-hand or left-hand helix and the opposed (but end loop-connected) pairs of such helices formed in one round trip or "circuit" of the guide is a double helix. Since successive turns in any one helix do not laterally contact each other, a number of double helices must be wound on, in a particular manner, to fill in the gaps and completely cover the underlying surface in a uniform manner. That is, a "coverage" consists of two interwoven plies ("layers"), each consisting of helices of the same (right or left) "hand". From a half coverage to several coverages may be wound on without changing the set of settings on the winding machine (i.e., the winding "set up" or machine program; not to be confused with a computer program).

Circuit

A "round trip" of the guide from one end of the core or bundle to the other and back again (the guide being the last device the fibers pass through, just before reaching the surface being wound on).

"Pattern"

Considering only helices wound in the same direction, a winding pattern is a series of helices in which the turns of later applied helices are disposed between (and "parallel" to) the turns of the first helix of the series in a regular manner such that the position of each successive helix "leads" or lags the preceding helix along the axis, until the turns of the last helix in the series is immediately adjacent to (just before or just after) the turns of the first helix.

The pattern is repeated as many times as is required to complete a coverage.

P The value of P codes for the choice made of a lagging or leading winding pattern "progression", i.e., the back and forth path, along chords of a circle, between points on the circumference of the core (or bundle) at which successive helices are initiated. (Reminiscent of criss-cross sequences in which head bolts of internal combustion engines are tightened.)

C The number of circuits per pattern. (See FIG. 7.)

Z The number of circuits per coverage.

N The number of coverages per winding set up; i.e., per stratum.

L Stroke length: the end to end distance the guide will travel; this will normally be greater than the axial length of the winding put on by the stroke, because the bundle will have dome-shaped ends beyond which the guide must be positioned during dwell.

E The axial length of the cylindrical portion of the winding to be formed; carriage travel per revolution of the mandrel is constant throughout this distance.

R Range The distance the guide travels while decelerating (to avoid mechanical shock) or accelerating, during turnaround. The mandrel RPM does not change but the distance the carriage travels per revolution of the mandrel does change (as does the winding angle), during this travel.

"Stratum" A bundle segment formed as an accumulation of successive coverages applied without changing the winding set up; this includes any fraction of a coverage added after the last complete coverage.

S The number of additional strokes made in applying the last fractional coverage—if any—in a stratum. (S usually is zero.)

f Filament speed—linear rate of travel of the filaments through the guide and onto the pipe.

"Formation" A major portion of the bundle formed as an accumulation of strata; the differentiation of the bundle into several formations may be visually discernible at the ends of the bundle.

W The normal band width—measured at right angles to the (parallel) filaments making up the band. (See FIG. 6.)

X The "circumferential band width" is the rectilinear distance between the points of intersection of the band edges with a plane perpendicular to the core axis. Determined by W and by the winding angle.

$W_a$ Axial band width—measured on a line parallel to core axis.

D. The diameter of the winding; generally taken as the diameter of the cylindrical "pipe" (mandrel or bundle) surface on which the turns are being wound. Usually necessary to arbitrarily adjust somewhat to satisfy relationship between W and Dwell.

A Winding angle for cylindrical portion of bundle

The angle between (1) the line of contact between the "pipe" surface and a plane parallel to the pipe axis, and (2) either edge of a half-turn of fiber band which has been unwound onto said plane. (See FIG. 6.) Mechanically, A is determined by the ratio of the carriage speed to the mandrel RPM·( D).

$A_p$ Polar winding angle. The winding angle required for a stable filament path over a dome. (See FIG. 7.) In conventional winding practice, $A_p$ takes the place of A throughout the winding of a domed-ended cylinder.

H Headstock position The distance from the headstock (the driven "chuck" which grasps one end of the core, mandrel or arbor) to the corresponding end of the winding or bundle.

l The uncoiled length of one turn of a helix.

Dwell The degrees of rotation of the core during which the guide is stationary at the turnaround position.

T Turnaround time The sum of the time periods during which the guide is decelerating, dwelling and accelerating; since the core usually rotates at a uniform angular velocity, the turnaround time is conveniently expressed in degrees of rotation.

B "Polar opening" The diameter of the openings in the finished bundle ends through which the core protrudes, i.e., the core diameter at the plane of exit.

Axis A component—such as the mandrel, carriage, cross-feed arm or rotatable eye—which moves relative to the components it interacts with or is mounted on.

M A number which has a value dependent on the particular set of mandrel drive gears being used. The value of M is the number of electronic "pulses" that will be transmitted to the computer from the mandrel encoder per revolution of the mandrel, divided by 10,000, and is independent of the angular rate of revolution of the mandrel. By counting the number of pulses received during movement of each axis from its reference position, the computer can keep track of the position of that axis.

Mathematical Relationships for Helical Winding on a Domed-ended Cylinder $$Z = \frac{\pi D \cos A}{X} \cos A = W/X$$

$$\sin A = W/W_a$$

For stable filament path, polar winding angle (in radians):

$$Ap = \left(\arcsin \frac{B}{D}\right) + \frac{W}{D}$$

$$l_c = n \sqrt{(\pi D)^2 + n^2} \text{ and } E = nh$$

Where
$l_c$ = unwound length of coil
n = number of turns in coil of axial length E
D = coil diameter
h = axial advance per turn ("pitch")
If n=1, $l_c^2 = D^2 + n^2$ and $\sin A = \pi D/l_c$.

Turning now to FIG. 1 of the drawings, the depicted assembly (denoted generally as 1) consists of a porous core (2), shown mostly in phantom, a fiber bundle (3) and a resinous wall member (4). Only a few of the pores (5) in the core (2) are shown (considerably magnified). The fiber bundle (3) consists of helical wraps (only a few, magnified, portions depicted) of at least one length (6) of a band of permeable, hollow fiber tows wound in helical pattern around the Core. The generally toroidal wall member (4) through which the fiber and the core pass in sealing engagement, has been built up while the fibers were being wound on, and cured in place.

In FIG. 2, the permeator (denoted generally as 10) is depicted as three shortened segments but ordinarily has a length to diameter ratio of at least 6 to 1. The permeator comprises an inner assembly (denoted generally as 11), two abutted, sprayed fiber glass halves of a casing winding preform (12; shown only in phantom) and a helically wound, fiber glass casing (13; also in phantom). The inner assembly includes a tubesheet (denoted generally as 14), a unitary, sub-assembly (not separately numbered) which includes a porous, fiber glass/epoxy core (15) which has been formed in sealing engagement with a pre-assembled combination of plumbing fixtures which comprises a stainless steel inlet fitting (16), a stainless steel, brine ("raffinate") discharge fitting (17), a stainless steel, permeate discharge pipe (18) and a cross-flow block (19) which has been formed by casting an epoxy resin around the inner end (20) of the permeate discharge pipe, in a manner such as to partially fill pipe end (20), with a plug (21) which is integral with block (19), and by drilling longitudinal feed passages (22; shown in phantom). Discharge fitting (17) is sealingly engaged with the outer end (23) of the permeate discharge pipe by a cylindrical body (24) of potting resin, emplaced before core (14) was formed. Tubesheet (14) includes a generally toroidal, resinous wall member (25) sealingly adhered to core (15) and through-pierced on a diameter by a main (permeate header) bore (26) which registers with diametrically opposed, diamond-drilled openings (27) in the core, which in turn register with openings (28) in the cross-flow block (19), the latter openings registering with openings (29) in the wall of pipe (18). Wall member (25) is also pierced by a number of smaller bores (30). Bores (26) and (30) cut the fibers potted in the wall member (25) to provide for permeate egress from the fiber lumens. Bores (26) and (30) also intercommunicate through and depend from a shallow trench (31) routed out of the peripheral portion of the wall member and capped by a bonded-on, encircling fiber-glass hoop (32). A plurality of bonded-on spacer ribs (33) are disposed at intervals around the circumference of the tubesheet (14) between the hoop (31) and the preform (12), thus rigidifying the overall structure without impeding feed flow.

It should be noted that the terminal and central portions of core (15) are made of laid-up, non-porous fiber glass plies but the rest of the core is porous, to permit egress of the raffinate (brine or concentrate) from between the fibers. As shown, the feed flow follows an "outside in" path through the bundle. However, inside out flow, although generally less desirable, is perfectly feasible (see FIG. 1 in the '296 patent).

Fiber bundle (34) is depicted ideally, with the exception of the upper right-hand portion which is more realistically portrayed, and consists of four formations (I, II, III, IV) of strata (35), some of the latter being partially omitted in formation I to maintain distinctness of the lines. The latter bundle portion is shown, enlarged and with all strata complete, in FIG. 2A.

FIG. 3 is an enlarged, perspective view of the cross-flow block (19) and the inner end portion (20) of the permeate egress tube (18; FIG. 2); feed passageways (22) and permeate passageways (28) conduct the feed and permeate through the block in paths generally at right angles to each other.

FIG. 4 similarly depicts a sub-assembly of a cross-flow block framework and permeate egress tube which can be added to an already formed tripartite ("bare bones") version of the assembly of the invention (depicted in FIG. 1). The inner end (40) of the tube is positioned as shown within a generally U-shaped, fiber glass/epoxy framework (bracket; 41) comprising a bottom plate (42), against which the end of tube section (40) bears, and two, generally parallel side plates (43) joined to plate (42 as shown. Elements (40), (42) and (43) are "tacked" together with a little epoxy (not shown) along lines of contact with each other and the resulting sub-assembly (not separately numbered) is forced into the core of the assembly. The assembly is then vertically positioned; the opposed spaces between the inner surface of the core (shown in phantom but not numbered), the bracket plates (42), (43) and the pipe end (40) are then filled with an epoxy (not shown) and allowed or caused to cure in place. This procedure of course requires that the core ends be adapted for subsequent insertion of the feed inlet and permeate egress fittings, followed by emplacement and curing of appropriate bodies of adhesive resin between the fittings and the core ends (by methods which will be apparent to those knowledgeable in the art).

FIG. 5 is a reasonably accurate, longitudinal cross-sectional representation of a portion (50) of a fiber bundle constructed on a core (51), as described in Example 1 herein. It consists of five formations (V, VI, VII, VIII, IX) of 7, 10, 5, 12 and 7 strata (52), respectively. The core (51) consists of fiber/glass epoxy, is of uniform internal diameter but includes end sections (53) which are of tapering wall thickness, as shown. The non-tapered sections (54) of the core are pierced by pores (55). The longitudinal and radial dimensions of the represented core/bundle assembly portion are measured from the median circumference (not shown) of the core and from the core axis, respectively, and are indicated by the horizontal ($L_s/2$) and vertical (Radius) scales provided. ($L_s/2 = \frac{1}{2}$ of stratum length).

It will be seen that the hump at the end of the first strata in each formation is substantially displaced from the axial position of the immediately preceding first stratum hump and that the winding parameters are controlled so that the degree of "dog boning" for the bundle as a whole is relatively minor. The bundle represented in the Figure had a maximum diameter of about 16 inches at the stage of completion shown but the construction could have been continued in the same general manner to make a bundle having a maximum diameter of about 24", without increasing the absolute difference between greatest and least diameters.

In FIG. 6, two separated half turns of a helical wind of a fiber band (60) of normal width W are shown unwound from a core (61) of radius D/2 into the plane of the drawing sheet (seen tangential to the core in an end view).

The winding angle A is the angle between either edge of the flattened band segment and the line of contact between the core surface and that segment.

The relationship between sin A, W and Wa (the axial band width) is illustrated by the depiction of one-half turn and the relationship between cos A, W and X (the circumferential band width) by the other. It will be apparent from the triangle PQU and the lengths of lines OU and PO ($\pi D/2$) and $\frac{1}{2}$, respectively) that sin $A = \pi D/1$.

In FIG. 7, five different geometrical patterns, corresponding to as many different sets of Z, C and P valves are shown. In each pattern, the curved arrow shows the direction of rotation of a developing fiber bundle (not shown as such), the inner circle represents the surface (70) of the bundle at the basal plane of a dome-shaped end section (not shown) and the outer circle (in phantom; not numbered) represents the next such surface to be formed when one more coverage has been completed. The radial lines between the two circles represents the edges of Z cross-sections of the band (71) of fiber tows (72) from which the bundle is being formed For simplification, only the right-hand helices in the coverage are represented by the latter sections. The straight, solid arrows show the progression through the sequence of positions on the surface (70) which will be occupied by the number (C) of helices which will be laid on before the last one of them is immediately adjacent to the section (71) already in place (at which point, the first "pattern" will have been completed). The straight, dashed arrows show how the pattern will be repeated until coverage is complete.

Winding Systems

It is considered possible to fabricate assemblies of the present invention using winding machines which are flexible and highly automated, though not computer-controlled, but economic and quality control considerations weigh heavily in favor of computer-controlled systems. Given the states of the art of winder designs, electronic control circuitry and computer programming, those knowledgeable in these arts are well able to assemble and program computer-controlled winder systems adapted for the practice of the invention. However, a suitable computer-controlled, "three axis" (an axis is a recognizeably separate assembly—such as a carriage, mandrel or a guide—which can move in at least one direction independently of the other assemblies it is connected to) winding system is commercially available from McClean-Anderson, Inc., Milwaukee, Wis. (U.S.A.), which also provides the requisite software (in the form of casettes or discs). A system of the latter type, the so-called "N-101", is the one used in the Example herein.

Desiderata

In addition to delocalizing dog-boning and anchoring and stabilizing the bundle, it is essential that the bundle have a low resistance (low $\Delta p$) to flow through it of the feed fluid to be processed in the permeator. Also, uniformity of fiber packing and crossing throughout the bundle is essential to avoidance of channeling (and coincident polarization and scaling) and facilitates flushing and reverse flow cleaning/desilting operations. Another desideratum is for the length of the (shortest) flow paths through the dome-shaped end portions of the bundle to the porous (or permeable) section of the core to be comparable to the length of the (shortest) flow paths to the core through the rest of the bundle.

Constraints

When the fibers of which the band is composed must be kept wet with a liquid in order to preserve their permeability (or other) properties, the least winding angle at which the turns will "stay put" is greater and the greatest angle (assuming helical, not circumferential winding) is smaller. Another constraint on winding angle range inheres in the choice of a core having a relatively high L/D ratio (to permit construction of an elongate bundle). That is, as the L/D ratio goes up, the minimum angle for a "stable filament path" increases and the maximum angle decreases. Thus, when winding wet, cellulose acetate fibers on fiber glass cores having L/D ratios of about 16–20, satisfactory wind stability has not been experienced at wind angles outside the range of from about 25° to about 50°.

The minimum degrees of dwell required depends on factors such as fiber tension, the coefficient of friction between the fibers and the surface area on which turn-around occurs and the configuration of the body (core or bundle portion) which defines that surface. The more of a shoulder on which the band can "hook" as the helix reverses hand, the less dwell required or the greater the fiber tension or the lower the coefficient of friction can be. Thus, when winding wet cellulose ester fiber bands on a fiber glass/epoxy composite core, a relatively high dwell angle (about 110°, for example) has been found suitable or construction of the first stratum of the bundle. The dwell for the second stratum can then be considerably reduced (to about 15°, for example) if L is increased so that the second stratum extends beyond the ends of the first stratum and those ends can be utilized as "hooks". (This helps to reduce the thickness of the humps in the second stratum and shifts their peaks outward from the peaks of the humps in the first stratum.) For successively longer strata thereafter, a dwell in the range of about 45°-60° can be maintained until the first formation is complete. If the first stratum of the next formation does not extend beyond the peaks of the first formation humps, a relatively long dwell (134°, for example) will be employed again, but the dwell for the following, successively longer, strata in the second formation can be cut back to about 45°-60° again. (of course, the exact dwell angle for each stratum must dwell and the other winding parameter values selected, in order to make sure no turnaround end "loop" is superimposed on a preceding loop in the same coverage and no gaps are left between loops therein.)

The greater the tension on the fibers, the more effectively overlying coverages lock underlying coverages in place. Obviously, the tension cannot be so great that flattening of the underlying fiber results but a limit is otherwise imposed before such high tensions are reached. That is, the tension should not be great enough to stretch the fibers to the point where they will subsequently contract, given any opportunity to do so. Also, the thin, salt-rejecting surface layer which is critical to reverse osmosis utility of most known hollow may be damaged by stretching. Thus, with wet, cellulose ester fibers, tension within the range of from about 150 to about 350 grams per tow of 24 or 30 fibers have been found appropriate. (Although ten tows are usually combined as a band, i.e., are drawn onto the core or developing bundle together in parallel—each tow is separately tensioned.)

Positioning of Tubesheets-to-be

When the assembly of the invention is to have only one tubesheet, it is essential to have equal pressure drops through the fiber lumens on each side of the tubesheet. Therefore, the sole wall member from which the tubesheet will be derived should be positioned equi-distant from the ends of the bundle (assuming uniformity of fiber size, etc., in the bundle).

Similarly, when the number of wall members comprised in the assembly is 2 or more and the number of those members located at the bundle ends (where they will be dead-end "tubesheets") is 0, 1 or 2, the axial distance between any two adjacent wall members, neither of which is at an end of the bundle, should be about twice the distance from either end of the bundle to the nearest wall member spaced from that end. This is because the fiber portions between the bundle and the nearest wall member spaced from it are loops, having lengths about twice the distance from the bundle end to the nearest wall member (other than one located at that end).

General Procedure for Making an Assembly of the Invention

Core fabrication, selection and installation in winding machine.

The conduit to be utilized as the core may be of any regular cross-sectional shape on which helical fiber band winds will be stable but preferably is generally cylindrical. It may consist of any one or more of otherwise suitable materials such as metals, thermoset plastics, cured resin/fiber composites, graphite or ceramics (including glasses). The requisite foramini may be present in the material from which the core is formed; for example, a porous sinter or a cylindrical laminate of a resin impregnated, porous fabric. Alternatively, the walls of a preformed, imperforate pipe may be made porous by drilling, leaching or laser "needling".

The porosity of the conduit wall preferably is uniform from one end of the foraminous section to the other but can vary according to a preselected pattern when necessary to compensate for difference in flow resistances of flow paths between fibers in a non-uniform bundle.

As indicated earlier herein, other permeator elements, such as the "plumbing sub-assembly", may be incorporated in the core before bundle fabrication is commenced (or may be incorporated after the bundle has been formed).

The core may be held in position in the winding machine by such conventional means as mandrels or arbors inserted in the core ends (or in pre-installed end-fittings) and gripped by lathe-type headstock and tailstock jaws, or by any otherwise suitable, functionally equivalent means.

Tubesheet-precursor, Resinous Wall Member Formation

Application of the resin from which a wall member (tubesheet-to-be) is built up is usually not commenced until at least one coverage of fibers has been wound on to the core. It is readily accomplished by metering a resin of appropriate viscosity and curing characteristics to a nozzle positioned above the developing fiber bundle at the selected axial location and just in front of a flexible doctor blade which spreads the resin and wipes it into the bundle surface. Such operations can be carried out with any potting resin otherwise suitable for the kind of fibers employed and the conditions and materials the permeator-to-be will encounter. The resin choice is not an element of the present invention. Tubesheet resins disclosed in the prior art are suitable for the practice of the present invention. They may be cured by the action of curing agents included in the resin formulations and/or by the application of heat or irradiation.

Winding on of the Fibers

As a practical matter, the fibers will usually be applied in the form of a band of at least several multiple-fiber tows or rovings, each separately tensioned (by conventional means such as adjustably rotation-resistant, opposed pairs of foam surfaced rolls followed by pulleys mounted on spring-loaded idler arms). The band is fed over or through appropriate guides (hooks, eyes, pulleys, etc., the last of which is a winding machine component which is moved back and forth parallel to the core axis as the core is rotated. In the N-101 machine referred to earlier herein, for example, this component is an eye or—preferably—a multiply-grooved pulley which is positioned on the end of a retractable/advanceable "cross feed" arm extending toward the core from a carriage which travels back and forth alongside it. The eye or the axis of the revolving pulley may be caused or allowed to rotate back and forth in a vertical plane in cooperation with or in response to the pull of the band, one way or the other at each turnaround, around an axis common to or parallel with that of the cross-feed arms. The latter motion of the pulley is resisted somewhat by a coil spring, to prevent "chatter". The cross-feed arm is initially advanced until the pulley is at a preselected distance from the bundle (core) and is then periodically retracted—generally just after a stratum is completed—as necessary to re-establish the initial spacing. Unless the cross-feed arm is programmed to move during turnaround, the distance from the pulley to the bundle increases as the dwell point is approached. The angle and pull of the fiber band changes during turnaround, even if the cross-feed arm does move.

Establishing a winding "set up" (the succession of values given the various winding parameters as the bundle or bundle segment grows) is a trial and error process to some extent, at least for state of the art machines, which are not really designed to build up relatively thick accumulations of windings. Certain values of the parameters are assumed and one or more coverages are wound on and observed for slippage, winding gaps or laps and adequacy (or excess) of dwell at turnaround. (The memory of the system's computer has stored in it the relationships between the selected parameter values; the software utilizes these relationships to calculate the motions required of the different machine axes and directs the operation of the machine accordingly.) If necessary, the resulting first stratum is cut off and discarded and the experiment repeated but with such changes as appear to be indicated having been made in various of the winding parameters. This experiment is repeated until a satisfactory first stratum is obtained, and the resulting "program" for the machine is stored. And so on, until a sequence of such programs which will produce a bundle of the desired dimensions, shape and stability has been devised.

The actual width (W) of the fiber band as it lays down on the "pipe" surface cannot exceed the width of the band as it leaves the pulley and will be slightly less than the latter width, in proportion to the distance from the pulley to the pipe surface. In order to minimize the rectilinear length of the windings from end to end of the bundle, the angle A should be relatively small but must be large enough so that a stable filament path results.

The procedure for working out set ups for the successive strata will now be described in more detail. The actual dimensions of the core and the fiber band selected will of course be known and the latitude to be allowed the winding angle will generally have been decided on the basis of considerations other than bundle stability. Likewise, N—the desired number of coverages per stratum—and a filament speed (f) will have been at least tentatively selected.

The actual width (W) of the band as it feeds onto the pipe surface can be decreased by moving the guide (eye or pulley) back but only at the expense of a rapidly increasing loss of control of the lay down. Consequently, the winding angle is the parameter more amenable to change in order to ensure that Z—the number of circuits per coverage—will be a whole number. That is, $Z = D/X$ and X—the circumferential band width—is $A/\cos A$. (For helical winding, X must be less than $D/2$.)

The parameter R (deceleration or acceleration range) will have a lower limit imposed by the necessity to minimize mechanical shock to the machine at turnaround. For the N-101, this limit is 1" of carriage (guide) travel per 10 ft. per second of carriage velocity prior to deceleration; the carriage speed $= A \div (D$ cot mandrel RPM). In order to minimize dog-boning, R is conventionally kept as low as possible In the practice of the present invention, dog-boning is distributed, rather than piled up (and subsequently cut off). Thus, so long as the desired dome shape of the bundle ends is not consequently distorted to an intolerable degree, R may be made somewhat larger when this facilitates establishment of a turnaround "time" (T) which will result in complete coverage by a whole number of circuits (C).

The turnaround time—in degrees of pipe rotation—is $$T = \frac{\text{Tan}A \cdot R \cdot 360}{D} + \text{Dwell}.$$

The conventional minimum and maximum values of T result when Dwell is 0° and 360°, respectively. Zero dwell is not feasible for the practice of the present invention; the dwell may be equal to or greater than 360° but ordinarily will be less than 360°. In general, not many values of T will satisfy the requirement that each coverage be complete. When the value of Z is such that several values of C are possible and if more fiber crossovers are acceptable, then more T values to choose from are possible.

The more values C can have, the more likely it is that a T value can be found for which the locations where the band crosses the basal circumference of the dome will coincide with positions in one of the patterns corresponding to those C values. (See FIG. 7.)

If Z-1 is a prime number, C can only be 1 but if Z-1 is not a prime number, then C can be any integral divisor of Z-1 (except Z-1). (For example if $Z=12$, $Z-1=11$ and C can only be 1 but if $Z=13$, 1073 $Z-1=12$ and C can be 1, 2, 3, 4 or 6; if $Z=10$, $Z-1=9$ and C can be 1 or 3).

For helical winding on dome-ended mandrels or preforms, conventional practice (with winding machines such as the N-101) is to employ special values for some of the parameters (T, A and R) for helical winding, to include the parameter B (the diameter of the "polar openings" around the protruding core ends) and to bring into play the cross-feed arm (and perhaps the "rotating eye") as auxiliary axes during the turnaround period terminating or commencing each stroke of the carriage. The required motions of these axes are determined by trial and error, using a manually operated, model airplane-type "joy stick". The carriage is operated according to a helical winding set-up stored in the computer memory and the motions of the auxiliary axes are recorded therein as a separate set-up. If necessary, the succession of positional coordinates recorded for a motion of an auxiliary axis can be modified to "polish" the latter set-up. The set-ups for the carriage and the auxiliary axes can then be combined so that the machine can automatically perform the overall winding operation.

In order to achieve a stable filament path on a dome, the value of A must satisfy the following relationship with B, W and D:

$$Ap = \left(\arcsin \frac{B}{D}\right) + \frac{W}{D}.$$

The required value of R (which is nominally equal to $(L-E) \div 2$) is actually the dome "length" (radius for a hemispherical dome, shortened by the truncation at the polar opening. The filament speed selected for the winding should be such that the corresponding carriage speed (=f CosA) does not exceed the appropriate limit for the winding machine used (up to 10R but not in excess of 150 ft./min., for the N-101). The mandrel RPM required is then determined as (filament speed sin A)÷ D.

As a first approximation, the appropriate value of T for a stable filament path on the dome is found by placing a filament on the surface in a path which is tangential to the protruding core ("neck") and crosses the circumference at the base of the dome at two separated points, moving the filament back and forth within that path and noting whether it stays in the path or slips towards either the base or end of the dome. When a circumferential spacing between the latter points is found at which the filament path is stable, the subtended arc between the points is measured and the length of it in degrees calculated. The resulting T value is then corrected—according to the requirements for the helical portion of the wind—using the largest suitable C value.

The most appropriate value of P (the choice of a lagging or leading wind pattern) is then made. If necessary, "corrections" of W, T, C and/or A are made (preferably by the computer) to arrive at the best compromise possible.

Modifications of Conventional Practice

It has been found feasible to wind "dome" ended fiber bundles without resort to auxiliary axes. That is, the cross-feed arm and rotatable eye need not be moved relative to the carriage during construction of a stratum (during completion of a winding set-up). The cross-feed arm is moved, as the first step in each succeeding set-up, but only to change the guide position so that the pipe surface to guide distance remains within a preselected range (such as 2-3 inches, for example) as the bundle diameter increases.

Except for the following "fudging" as to winding parameters, the set-ups for the strata constituting the formations are devised as though the entire bundle were generally cylindrical in shape. For the first stratum in the first formation, the parameter values initially given the computer are generally the true values. If the degrees of dwell calculated by the computer are judged high enough to ensure good "locking on" of the first stratum, the set-up for it is accepted at that point. Otherwise, the values of L, D, W, etc., given the computer (for a second try) are adjusted somewhat from their true values to try to get a longer dwell from the computer. For the rest of the strata after the first in each formation, the idea is to minimize dwell in order to minimize dog-boning, and the parameter values required to give a relatively short (but still adequate) dwell may or may not be the actual values. For the first stratum in each formation after the first one, it is often possible to guess at appropriate adjusted parameter values to get the desired extended dwell values, on the first try.

In order to ensure that the value of Z corresponding to the actual values of D, W, A, etc., is maintained, the adjustments made in D and W are within the constraint that the ratio of D to W is not changed. Otherwise, the magnitudes of the adjustments required for the desired dwells have not been found such as to adversely effect the bundle characteristics to any noticeable degree.

EXAMPLE

The following example is for purposes of illustration and is not to be construed as limiting the present invention in a manner inconsistent with the claims in this patent.

EXAMPLE 1

A fiber bundle having the characteristics depicted in FIG. 5 of the drawings was wound on a core of the configuration depicted in the Figure. (The resulting sub-assembly did not include a tubesheet-to-be but could have without altering the structure of the bundle ends. An otherwise essentially identical assembly including the wall member depicted in FIG. 1 has been modified to convert the wall member to a tubesheet and incorporated in a permeator (see FIG. 2) which was tested and found to function very satisfactorily as a means for recovering potable water from brackish water.

The fiber band used to construct the bundle consisted of ten tows of 24 fibers each, the fibers being cellulose acetate fibers having an O.D. of 305 microns. The thickness of each coverage was 0.1069 inches. For all strata: S=0, A=45° and P=2. C was 1 for all strata except Nos. 2-7, for which C was 2. The set-ups for the strata depicted in FIG. 5 are tabulated in Table 1 following.

TABLE 1

SET-UPS FOR BUNDLE OF FIG. 5

| F[1] | Stratum | $L_s/2$[2] | T | W[3] | Z | Dwell | R | D |
|---|---|---|---|---|---|---|---|---|
| I[4] | 1 | 44 | 318.925° | 1" | 14 | 150.175° | 3" | 6.40 |
| | 2 | 46 | 222.868 | | | 51.439 | | 6.30 |
| | 3 | 47 | 216.416 | | | 48.191 | | 6.42 |
| | 4 | 48 | 213.445 | | 15 | 48.559 | | 6.55 |
| | 5 | 49 | 209.772 | | | 48.095 | | 6.68 |
| | 6 | 50 | 206.254 | | | 47.663 | | 6.81 |
| | 7 | 51 | 205.139 | | | 49.743 | | 6.95 |
| II[5] | 8 | 41 | 297.699 | 1.1 | 16 | 157.139 | 3 | 7.70 |
| | 9 | 43 | 200.547 | 0.98 | 17 | 55.775 | | 7.46 |
| | 10 | 44 | 189.760 | | | 47.279 | | 7.58 |
| | 11 | 45 | 184.739 | | 18 | 45.023 | | 7.73 |
| | 12 | 46 | 179.359 | | | 42.303 | | 7.88 |
| | 13 | 47 | 177.313 | | | 43.151 | | 8.05 |
| | 14 | 48 | 179.900 | 1 | | 48.991 | | 8.25 |
| | 15 | 49 | 175.467 | | 19 | 46.895 | | 8.40 |
| | 16 | 50 | 170.683 | | | 44.367 | | 8.55 |
| | 17 | 51 | 166.057 | | | 41.919 | | 8.70 |
| III[6] | 18 | 46 | 260.585° | .93 | 20 | 142.319° | 3 | 8.42 |
| | 19 | 48 | 165.396 | 1.05 | | 51.711 | | 9.50 |
| | 20 | 49 | 158.508 | | | 46.591 | | 9.65 |
| | 21 | 50 | 152.283 | | 21 | 42.079 | | 9.80 |
| | 22 | 51 | 157.343 | | | 43.343 | | 10.00 |
| IV[7] | 23 | 39 | 232.447 | 1.15 | 24 | 146.047 | | 12.5 |
| | 24 | 41 | 142.015 | 1.05 | 25 | 48.911 | | 11.60 |
| | 25 | 42 | 135.317 | | | 43.791 | | 11.80 |
| | 26 | 43 | 132.010 | | | 42.383 | | 12.05 |
| | 27 | 44 | 132.217 | | 26 | 44.767 | | 12.35 |
| | 28 | 45 | 128.170 | | 27 | 42.319 | | 12.58 |
| | 29 | 46 | 126.414 | | | 42.367 | | 12.85 |
| | 30 | 47 | 126.721 | | 28 | 44.591 | | 13.15 |
| | 31 | 48 | 123.724 | | | 43.327 | | 13.40 |
| | 32 | 49 | 124.048 | | | 45.215 | | 13.70 |
| 8 | 33 | 50 | 121.403 | 1.10 | 28 | 43.983 | 3 | 13.95 |
| | 34 | 51 | 119.096 | | 29 | 43.039 | | 14.20 |
| V[9] | 35 | 43 | 214.735° | 1.04 | 29 | 134.735° | 3 | 13.50 |
| | 36 | 46 | 107.341 | 1.24 | | 40.879 | | 16.25 |
| | 37 | 47 | 106.516 | | 30 | 41.455 | | 16.60 |
| | 38 | 48 | 105.540 | | | 41.823 | | 16.95 |
| | 39 | 49 | 104.811 | | 31 | 42.383 | | 17.30 |
| | 40 | 50 | 104.085 | | 32 | 42.895 | | 17.65 |

TABLE 1-continued

SET-UPS FOR BUNDLE OF FIG. 5

| F[1] | Stratum | $L_s/2$[2] | T | W[3] | Z | Dwell | R | D |
|---|---|---|---|---|---|---|---|---|
| | 41 | 51 | 99.983 | 1.21 | 33 | 39.674 | | 17.90 |

NOTES:
[1]Formation No.
[2]Stratum length ÷ 2.
[3]Nominal or actual width 1" but other values shown given to computer instead of actual width.
[4]13 coverages × 0.1069" = 1.3897" formation thickness for cylindrical portion of bundle.
[5]10 × 0.1069 = 1.069".
[6]5 × 0.1069 = 0.5345".
[7]12 × 0.1069 = 1.2828".
[8]2 × 0.1069 = 0.2138".
[9]7 × 0.1069 = 0.7483".
[10]Total thickness of cylindrical portion of bundle: 47 × 0.1069 = 5.0243". Cylindrical diameter = 2 × 5.0243 + 6.4 = 16.45".

What is claimed is:

1. A method of forming a stable, self-anchored, generally cylindrical hollow fiber bundle having generally dome-shaped ends, by back and forth helical winding of one or more hollow fibers on a rotating core;

said method comprising controlling the winding so that said bundle consists of a plurality of successively shorter formations, each formation being of successively longer strata, each stratum consisting of from about one to a plurality of coverages, and each formation having somewhat enlarged end portions, thereby ensuring that the enlarged end-portions of each formation are axially located with respect to the corresponding such end-portions in adjacent formations so that the bundle itself does not have a substantially dog-boned shape and said bundle ends are generally dome-shaped.

2. The method of claim 1 additionally comprising forming a resinous, radially disposed, generally toroidal wall member, through which said fibers and core pass in sealing engagement therewith, at a location other than at an end of the bundle.

3. The method of claim 2 which includes:

A. providing as said core a rigid, generally cylindrical, elongated conduit having two end sections and an intervening foraminous section, B. selecting a hoop of the core surface as a site for construction of said wall members and, optionally, one or more additional hoops for construction of additional such wall members, C. forming said bundle and said wall members on said core by (1) helically winding a band, or a succession of bands, of hollow fiber lengths around said core in an alternating series of right- and left-handed helices, each band starting at about the midline of one of said sites and terminating in a plane at about the midline of the same or a different one of said sites while (2) applying a hardenable resin to said core and said band at each of said sites and thereafter continuing to apply such a resin to the resulting resin/fiber bodies forming at those sites, and D. allowing or causing said resin/fiber bodies to harden;

said winding being done in a succession of stages, as follows, to form said bundle;

in stage I (a) several ($N_a$) coverages of about equal axial length and of successively greater diameters are wrapped on to produce a first stratum which does not extend to either end of the core and is at least slightly humped proximal to each end of the stratum, as a consequence of the more localized accumulations of fiber during the turnaround portion of each end-to-end wind, the turnaround range and dwell, the value of $N_a$ and the tension on the fiber lengths being selected, according to the fiber and band dimensions, so that said first stratum will not slip on the core and the taper of the non-cylindrical end portions of the stratum will be sufficiently abrupt to provide substantial resistance to axial motion of an overlying, longer, second stratum if the latter is formed and emplaced as in (b) following:

(b) said second stratum is formed in essentially the manner in which the first stratum was formed and has a length such that the second stratum extends beyond each end of the first stratum;

(c) a succession of additional strata are added, as in (b), until the two ends of the resulting first formation are at least noticeably humped, in stage II step a is repeated, except that the resulting first stratum of the next formation-to-be is shorter than the first stratum of the immediately preceding formation, and steps b and c are repeated until the resulting second formation is at least noticeably humped at each end, with the result that the hump peaks of the second formation are closer together or further apart than those of the underlying first formation;

in each stage thereafter, steps a–c are repeated as in stage II, the lengths and N values of the successive strata being such that:

each formation has a substantially different inter hump-peak distance than the immediately preceding formation and each end of the finished bundle has the general configuration of a dome with a polar opening conforming to the core end protruding therefrom.

4. The method of claim 1 wherein the walls of said fibers are permeable.

5. The method of claim 3 comprising, as preliminary steps, providing those plumbing fixtures which must be incorporated in said core in order for said assembly to be utilizable in a perimeter and incorporating said fixtures in said core.

6. The method of any of claims 1, 2, 3, 4 and 5 comprising, as an additional step, adapting said assembly as necessary for use in a permeator and incorporating the adapted assembly in said permeator.

* * * * *

UNITED STATES PATENT AND TRADEMARK OFFICE
CERTIFICATE OF CORRECTION

PATENT NO. : 4,838,970

DATED : June 13, 1989

INVENTOR(S) : P.A. Thibos

It is certified that error appears in the above-identified patent and that said Letters Patent is hereby corrected as shown below:

Col. 4, line 41, after "sections" insert -- of said conduit extend and an intervening, generally --;

Col. 5, line 2, after "core" insert -- by --;

Col. 8, line 49, delete "(D)" and insert -- ($\Pi$D) --;

Col. 9, line 36, delete "$1_c^2 = D^2 + N^2$" and insert -- $1_c^2 = \Pi D^2 + N2$ --;

Col. 11, line 44, delete "OU and PO" and insert -- QU and PQ --;

Col. 12, line 66, delete "or" and insert -- for --;

Col. 13, line 14, after "stratum must" insert -- largely satisfy the inherent relationships between --;

Col. 13, line 28, after "hollow" insert -- fibers --;

UNITED STATES PATENT AND TRADEMARK OFFICE
CERTIFICATE OF CORRECTION

PATENT NO. : 4,838,970
DATED : June 13, 1989
INVENTOR(S) : P.A. Thibos

It is certified that error appears in the above-identified patent and that said Letters Patent is hereby corrected as shown below:

Col. 15, line 57, delete "Z= D/X" and insert -- Z=ΠD/X --;

Col. 15, line 59, delete "D/2" and insert -- ΠD/2 --;

Col. 15, lines 65 and 66 delete "=A÷(D cot mandrel RPM)" and insert -- =cot A÷(ΠD mandrel RPM) --;

Col. 16, line 32, delete -- 1073 --;

Col. 16, lines 59-63, change formula as follows:

$$\Delta p = \left( \arcsin \frac{B}{D} \right) + \frac{W}{D}$$
In radians

UNITED STATES PATENT AND TRADEMARK OFFICE
CERTIFICATE OF CORRECTION

PATENT NO. : 4,838,970
DATED : June 13, 1989
INVENTOR(S) : P.A. Thibos

It is certified that error appears in the above-identified patent and that said Letters Patent is hereby corrected as shown below:

Col. 17, line 5, delete "A) ÷ D" and insert -- A) ÷ ΠD --;

Col. 20, line 58, delete "perimeter" and insert -- permeator --.

Signed and Sealed this

Twenty-sixth Day of May, 1992

*Attest:*

DOUGLAS B. COMER

*Attesting Officer*     *Acting Commissioner of Patents and Trademarks*